(No Model.)
H. A. LEWIE.
FRAME FOR STAINED GLASS WINDOWS.
No. 517,049. Patented Mar. 27, 1894.
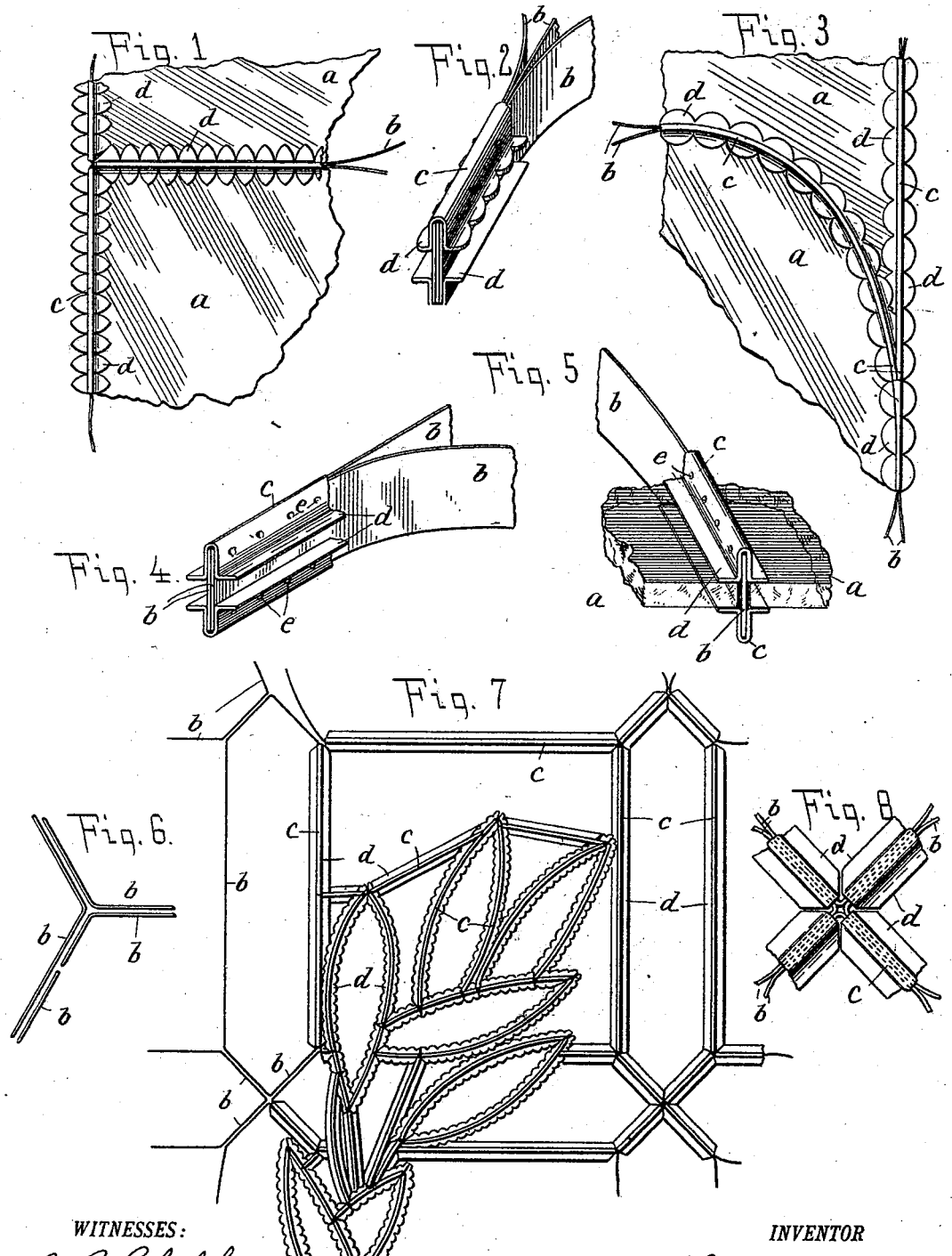
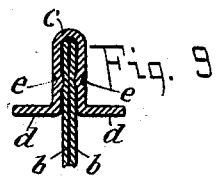
WITNESSES:
INVENTOR
Henry A. Lewie,
BY Briesen & Knauth
his ATTORNEYS.

UNITED STATES PATENT OFFICE.

HENRY A. LEWIE, OF NEW YORK, N. Y.

FRAME FOR STAINED-GLASS WINDOWS.

SPECIFICATION forming part of Letters Patent No. 517,049, dated March 27, 1894.

Application filed May 23, 1893. Serial No. 475,205. (No model.)

*To all whom it may concern:*

Be it known that I, HENRY A. LEWIE, residing at New York, in the county and State of New York, have invented an Improvement in Frames for Stained-Glass Windows, of which the following is a specification, reference being had to the accompanying drawings, forming part hereof, wherein—

Figures 1 and 3 are face views of pieces of stained glass connected by my new frame. Figs. 2 and 4 are perspective views of said new frame. Fig. 5 is a perspective view of a modification of the invention. Fig. 6 is a diagram representing the arrangement of parts of my new frame. Fig. 7 is a face view showing several pieces of glass united according to my invention; Fig. 8 a face view showing where four branches of my frame meet; and Fig. 9 is a partial cross-section through one end of my frame, showing the connection with the flanged cap.

My invention relates to improvements in framing for joining pieces of glass in stained glass windows or the like.

By my invention I produce a frame that can be put together and sold or shipped to any desired place to be filled with the pieces of glass, which when in position are securely held and produce the final effect desired.

To this end my invention mainly consists in combining an upright rib or series of ribs with separate flanged clamping caps, as hereinafter described.

The invention also consists in sundry other details of improvement that are hereinafter more fully pointed out.

Fig. 5 of the drawings illustrates perhaps most clearly the general principle of my invention. In this figure the letters $a\ a$ show two pieces of glass that are to be joined in my framing. Said framing itself, as appears from Fig. 5, consists of a central upright rib $b$, which stands between the glasses $a\ a$ and extends beyond each face thereof, as clearly shown. One edge of this upright rib $b$ receives a flanged cap C, whose flanges form resting places for the pieces of glass $a\ a$; the other edge of the rib $b$ carries a similar flanged cap C, whose flanges bear also upon the faces of the pieces of glass as shown. The caps C are joined to the upright rib $b$ by dents or inward depressions $e$, which are produced after the cap is put in place on the rib.

It is my desire to manufacture these frames out of brass or analogous metal which can be joined by hard soldering, and to construct the frame for shipment or transport prior to the insertion of the pieces of glass by putting the ribs $b$, according to the desired design, into proper relation to one another, soldering them together with hard solder (at least preferably so) wherever they meet, and to apply the flanged cap C to one side of the framing thus produced, fastening such cap by said dents $e\ e$, or by analogous means. The other caps for the opposite face of the framing I leave loose, and when the framing is ready to receive the glass, it is only necessary to put the pieces of glass in between the ribs $b$ prearranged in proper relation to one another and to rest them upon the flanges of the caps C that are already in place; and when the pieces of glass have been thus properly located, the caps C for the opposite side are put in position on the ribs and clinched fast by the dents $e$, whereupon the entire contrivance is finished and ready for display or use as a window, transom or the like.

It is not necessary that the rib $b$ shall be single; for many purposes it may be better to make it double. This is clearly shown in Fig. 4; that is, Fig. 4 indicates the upright rib $b$ to be made of two separate and practically disconnected plates; by disconnected meaning that, as long as the caps C C are not in position, said plates are not actually attached to one another. This permits me to deflect one of these plates in one direction, and another in another direction, whereby I obtain many advantages in the construction of the frame proper. Thus, in Fig. 8, where I have shown a face view of a corner of my framing—being a corner at which four branches meet—, it will be seen that the portion of each rib that is at the right, is at the corner bent to the right to enter another length of frame, while that portion of the same upright rib which is at the left, is at the corner bent to the left to produce another length of upright rib running in a different direction from that from which it started. By this arrangement the framing can be made exceedingly strong and durable. Nor is it necessary to make said upright rib b out of two separate plates. More than two may be used. Fig. 2 indicates, for example, an arrangement for three such plates to constitute the central rib, which arrangement, again, permits a still greater variety of connection and curvature. Speaking of curvature, it is of course known that in joining pieces of stained glass to produce a work of art or the like, many curves are frequently necessary, and the plates b that constitute my central rib being unincumbered by flanging of any kind can be readily made to conform to the specific design desired. This will be understood from an inspection of Fig. 7 of the drawings, which shows straight line and curved line portions of framing joined as they might happen to be in a stained glass window. It is of special advantage, also, that the caps C, which have the glass supporting flanges d, or bearing faces, shall be applicable, at least on one side of the frame after the glass has been put in position, and as a matter of fact the first cap applied is put in place after the ribs b have first been made to conform to the desired design.

In order to adapt the caps C to assume any desired curvature I have scalloped out the flanges d, as is clearly indicated in Figs. 1, 2 and 3. This scalloping not only produces a desirable design, but also facilitates the bending of the cap, which would otherwise become wrinkled at the flanges when bent into a curve. Of course the scallops indicated may either be of the kind shown in Figs. 1, 2 and 3, or may be more ornamental, each scallop being, for example, of the form of a trefoil, or of any desired design, the idea being that by reducing the width of each flange at certain predetermined intervals, it will be more conveniently bent into a curve and will also constitute an ornamental appendage to the stained glass window.

The formation of the dents e is very clearly indicated in Fig. 9. Any suitable compressing tool may be used for producing them. They are simply intended to produce an intimate connection between the caps C and ribs b after the caps have been put in place. Prior to the location of the caps, these dents should not be there, because it is absolutely necessary for the production of good work in stained glass windows that the ribs b at the time the pieces of glass are put in position should have no projection of any kind whatsoever, nor any recesses. A smooth uninterrupted surface for contact with the edge of the glass is essential. Still, instead of these dents e, other means of securing the caps to the ribs might be devised. I prefer the dents, because they do not mar the beauty of the structure, because they produce a proper connection, and because, nevertheless, they permit the removal of the cap for the purpose of repair or the like, since the dents cause a frictional contact rather than a positive interlocking of the parts, permitting with proper tools the removal of any cap after a piece of glass should be broken and its replacement by another after a new piece of glass shall have been inserted.

Having described my invention, what I claim, and desire to secure by Letters Patent, is—

1. In a framing for stained glass windows or the like, the combination of the rib b, the same being composed of two or more thicknesses of plates which are adapted to be bent in different directions from one another, with two flanged caps C C, each adapted to be placed over one edge of said central rib b, as and for the purpose specified.

2. In a framing for stained glass windows or the like, the combination of the central rib b the same being composed of the two or more thicknesses with the two flanged caps C C, the same having scalloped edges d, substantially as and for the purpose herein shown and described.

3. In a framing for stained glass windows or the like, the combination of the central rib b with the flanged caps C C placed over opposite edges of said central rib b, the connection between said flanged caps and said central rib being produced by dents e in the sides of said caps, as and for the purpose specified.

HENRY A. LEWIE.

Witnesses:
JAS. L. SUYDAM,
CHAS. E. SMITH.